(12) United States Patent
Hori et al.

(10) Patent No.: US 11,097,978 B2
(45) Date of Patent: Aug. 24, 2021

(54) BENT SUBSTRATE PROVIDED WITH PRINT LAYER, AND METHOD FOR MANUFACTURING SAME

(71) Applicant: AGC INC., Chiyoda-ku (JP)

(72) Inventors: Junji Hori, Tokyo (JP); Satoshi Mototani, Tokyo (JP); Jun Ito, Tokyo (JP)

(73) Assignee: AGC INC., Chiyoda-ku (JP)

( * ) Notice: Subject to any disclaimer, the term of this patent is extended or adjusted under 35 U.S.C. 154(b) by 266 days.

(21) Appl. No.: 16/152,602

(22) Filed: Oct. 5, 2018

(65) Prior Publication Data

US 2019/0031559 A1 Jan. 31, 2019

Related U.S. Application Data

(63) Continuation of application No. PCT/JP2017/014021, filed on Apr. 4, 2017.

(30) Foreign Application Priority Data

Apr. 8, 2016 (JP) .............................. JP2016-078186

(51) Int. Cl.
*B32B 3/02* (2006.01)
*C03C 17/00* (2006.01)
(Continued)

(52) U.S. Cl.
CPC .............. *C03C 17/002* (2013.01); *B05D 1/02* (2013.01); *B05D 1/327* (2013.01); *C03C 17/22* (2013.01);
(Continued)

(58) Field of Classification Search
CPC .......... B05D 1/32; B05D 1/322; B05D 1/325; B05D 1/327; B32B 3/02; B32B 3/04;
(Continued)

(56) References Cited

U.S. PATENT DOCUMENTS 4,350,550 A 9/1982 Van Manen
6,041,702 A 3/2000 Ichikawa et al.
(Continued)

FOREIGN PATENT DOCUMENTS

JP 5-345164 A 12/1993
JP 8-118778 5/1996
(Continued)

OTHER PUBLICATIONS

Machine Translation of JP 2005-096400 (Year: 2005).*
(Continued)

*Primary Examiner* — Zachary M Davis
(74) *Attorney, Agent, or Firm* — Oblon, McClelland, Maier & Neustadt, L.L.P.

(57) ABSTRACT

A method for manufacturing a bent substrate, having a masking step of forming a masking member (M) on a bent substrate (10) and forming a predetermined pattern, and a printing step of forming a print layer (P) on a surface to be printed of the bent substrate (10) including the masking member (M). It is thereby possible to perform printing on a bent substrate having a curved surface part in a productive manner and at a high printing accuracy.

19 Claims, 5 Drawing Sheets

(51) Int. Cl.
*B05D 1/02* (2006.01)
*C03C 17/22* (2006.01)
*C03C 17/28* (2006.01)
*B05D 1/32* (2006.01)
*B41M 1/12* (2006.01)
*B41M 1/40* (2006.01)
*B41M 5/00* (2006.01)
*B41M 7/00* (2006.01)
*B05D 3/02* (2006.01)
*B32B 3/28* (2006.01)
*B05D 3/06* (2006.01)

(52) U.S. Cl.
CPC ............ *C03C 17/28* (2013.01); *B05D 3/0263* (2013.01); *B05D 3/067* (2013.01); *B32B 3/28* (2013.01); *B41M 1/12* (2013.01); *B41M 1/40* (2013.01); *B41M 5/0011* (2013.01); *B41M 5/0088* (2013.01); *B41M 7/00* (2013.01); *C03C 2218/112* (2013.01); *C03C 2218/119* (2013.01); *C03C 2218/32* (2013.01); *C03C 2218/328* (2013.01); *C03C 2218/34* (2013.01)

(58) Field of Classification Search
CPC ..... B60J 1/00; B60J 1/001; B60J 1/002; B60J 1/003; B60J 1/008; B60J 1/02; B60J 1/018; C03C 17/02
USPC ........ 428/121, 124, 130, 198; 427/143, 259, 427/272, 282, 504, 510, 526
See application file for complete search history.

(56) References Cited

U.S. PATENT DOCUMENTS

| | | |
|---|---|---|
| 8,561,535 B2 | 10/2013 | Sabia et al. |
| 2004/0218400 A1 | 11/2004 | Egashira |
| 2015/0140324 A1 | 5/2015 | Kishimoto et al. |
| 2016/0088726 A1* | 3/2016 | Jeon ............... H05K 1/147 361/749 |
| 2017/0059749 A1 | 3/2017 | Wakatsuki et al. |
| 2018/0031743 A1 | 2/2018 | Wakatsuki et al. |

FOREIGN PATENT DOCUMENTS

| | | |
|---|---|---|
| JP | 2003-151311 | 5/2003 |
| JP | 2005-96400 | 4/2005 |
| JP | 3677150 | 7/2005 |
| JP | 2007-55144 | 3/2007 |
| JP | 2013-249338 | 12/2013 |
| JP | 2015-199284 | 11/2015 |
| WO | WO 2015/174428 A1 | 11/2015 |
| WO | WO 2016/013646 A1 | 1/2016 |

OTHER PUBLICATIONS

International Search Report dated Jul. 4, 2017 in PCT/JP2017/014021, filed on Apr. 4, 2017 (with English Translation).
Written Opinion dated Jul. 4, 2017 in PCT/JP2017/014021, filed on Apr. 4, 2017.

\* cited by examiner

BENT SUBSTRATE PROVIDED WITH PRINT LAYER, AND METHOD FOR MANUFACTURING SAME

TECHNICAL FIELD

The present invention relates to a bent substrate provided with a print layer, and a method for manufacturing the same. In more detail, the invention relates to a bent substrate provided with a print layer printable on a largely curved surface to be printed on a transparent bent substrate and a surface to be printed having a three-dimensional concavo-convex curved surface, and a method for manufacturing the same.

BACKGROUND ART

A technology of performing screen printing to a bent glass having a curved surface shape is widely known (for example, see Patent Documents 1 and 2). Patent Document 1 describes a printing method of using a screen plate corresponding to a shape of a surface to be printed to the surface to be printed having a curved surface shape, and pushing and sweeping the screen plate with a squeegee. Patent Document 2 describes a curved surface screen printer in which a screen plate is rotatable according to a curvature of a surface to be printed such that the screen plate always faces a tangent direction to the surface to be printed.

PRIOR ART DOCUMENT

Patent Document

Patent Document 1: U.S. Pat. No. 8,561,535
Patent Document 2: Japanese Patent No. 3677150

SUMMARY OF THE INVENTION

Problems that the Invention is to Solve

A flat screen plate is used in the printing methods described in the above Patent Documents 1 and 2. For this reason, the screen plate does not reach a surface to be printed of an article having a bending depth of more than a limit of pushing-in from a flat surface, and printing cannot be performed. Furthermore, because a flat screen plate is used, a convex part sometimes interferes with the screen plate when printing a concave part on the surface to be printed of an article having both a convex part and a concave part, and printing cannot be performed by this.

Other than screen printing, printing methods such as pad printing, spray printing and film transferring are known as a printing method of a surface to be printed. However, those methods have different problems respectively, and a development of a printing technique having high printing accuracy and good productivity to a bent substrate curved with small curvature as described above has been desired.

The present invention has been made in view of the above circumstances, and its object is to provide a bent substrate provided with a print layer printable on a bent substrate having a curved surface part in high printing accuracy and good productivity, and a method for manufacturing the same.

Means for Solving the Problems

The above object of the present invention is achieved by the following constitutions.

(1) A method for manufacturing a bent substrate provided with a print layer, including:
a masking step of forming a masking material on a bent substrate to form a predetermined pattern; and
a printing step of forming a print layer on a surface to be printed of the bent substrate provided with the masking material.
(2) The method for manufacturing a bent substrate provided with a print layer according to (1), further including a mask-cleaning step of cleaning an end face of the masking material after the masking step.
(3) The method for manufacturing a bent substrate provided with a print layer according to (1) or (2), further including a heating step of heating a printing material printed on the bent substrate.
(4) The method for manufacturing a bent substrate provided with a print layer according to any one of (1) to (3), further including a step of irradiating a printing material printed on the bent substrate with UV.
(5) The method for manufacturing a bent substrate provided with a print layer according to any one of (1) to (4), wherein in the masking step, a printing material different from a printing material used in the printing step is printed as the masking material.
(6) The method for manufacturing a bent substrate provided with a print layer according to any one of (1) to (5), wherein in the printing step, a printing material is ejected from a nozzle to be applied to the bent substrate.
(7) The method for manufacturing a bent substrate provided with a print layer according to any one of (1) to (5), wherein the printing step is carried by a spraying method including ejecting a printing material from a nozzle to be applied to the bent substrate.
(8) The method for manufacturing a bent substrate provided with a print layer according to any one of (1) to (7),
wherein the bent substrate includes a flat surface part and a curved surface part, and
the masking material is formed on the flat surface part.
(9) The method for manufacturing a bent substrate provided with a print layer according to any one of (1) to (8), further including a removal step of removing the masking material formed on the bent substrate after the printing step.
(10) The method for manufacturing a bent substrate provided with a print layer according to (9), wherein the removal step is a step of eluting the masking material in a solvent.
(11) The method for manufacturing a bent substrate provided with a print layer according to (9) or (10), further including a step of removing an end face of the print layer after the removal step.
(12) The method for manufacturing a bent substrate provided with a print layer according to any one of (1) to (11), wherein the bent substrate is fixed with a jig in at least one step of the masking step and the printing step, and the jig has a shape corresponding to the main surface of the bent substrate that contacts the jig.
(13) The method for manufacturing a bent substrate provided with a print layer according to any one of (1) to (12), wherein the bent substrate is a glass.
(14) A bent substrate provided with a print layer, having an angle α being an obtuse angle, wherein the angle α centers on the boundary between the print layer and a non-print surface on the bent substrate, and is formed by an end face of the print layer and a surface of the print layer that contacts a surface of the bent substrate, in a cross-sectional view along the thickness direction.

(15) The bent substrate provided with a print layer according to (14), wherein the angle α is larger than 90° and 120° or smaller.
(16) The bent substrate provided with a print layer according to (14) or (15), wherein the following relation is satisfied,

α≥β, wherein β is an angle formed by a tangent of an upper part of an end face of the print layer on the bent substrate and a tangent of the surface of the print layer that contacts the surface of the bent substrate, in a cross-sectional view along the thickness direction.
(17) The bent substrate provided with a print layer according to (16), wherein the angle β is 45° or larger and 120° or smaller.

Advantageous Effect of the Invention

According to the method for manufacturing a bent substrate provided with a print layer of the present invention, the method includes a masking step of forming a masking material on the bent substrate to form a predetermined pattern, and a printing step of forming a print layer on a surface to be printed of the bent substrate including the masking material. Therefore, printing can be performed to the surface to be printed of the bent substrate in high printing accuracy and good production efficiency.

Furthermore, according to the bent substrate provided with a print layer of the present invention, an angle formed by an end face of the print layer and a surface of the print layer that contacts a surface of the bent substrate is an obtuse angle, centering on the boundary between the print layer and a non-print surface on the bent substrate in a cross-sectional view along the thickness direction. Therefore, the accuracy of an end face of the print layer is improved and the print layer can have a uniform thickness up to the vicinity of the end face thereof. As a result, when a display panel is adhered to a non-print surface, good appearance is obtained. Furthermore, because the angle formed by an end face of the print layer and a surface of the print layer contacting a surface of the bent substrate is an obtuse angle, the bent substrate and a display panel fit to a used adhesive layer or the like when adhering the display panel to the non-print surface, and the bent substrate provided with a print layer and the display panel are strongly fixed to each other, making it difficult to peel. This makes it possible to withstand the use over a long period of time.

MODE FOR CARRYING OUT THE INVENTION

The bent substrate provided with a print layer according to the present invention and a method for manufacturing the same are described in detail below by reference to the drawings.

Figure 1:
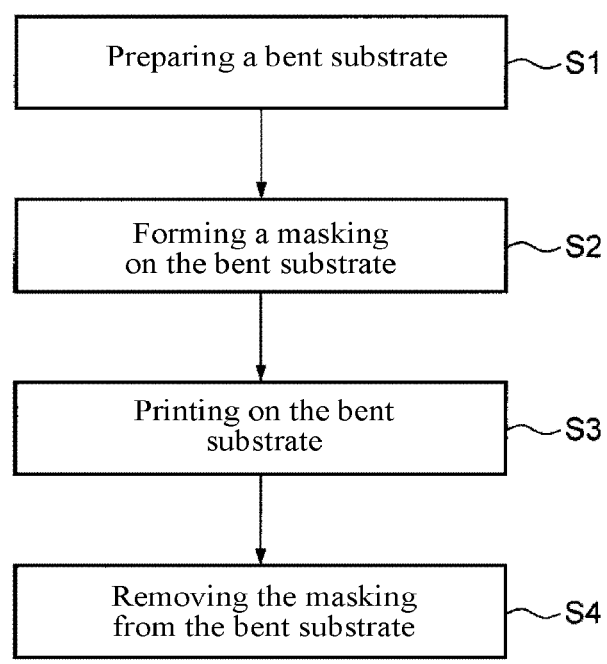
FIG. 1 is a flow chart illustrating manufacturing procedures of a bent substrate provided with a print layer.
(a) of FIG. 2 is a perspective view of a bent substrate having a masking material formed thereon, (b) of FIG. 2 is a perspective view of a bent substrate to which a printing material is applied by a spray method and (c) of FIG. 2 is a perspective view of a bent substrate in which the masking material has been removed and a print pattern has appeared.

As shown in FIG. 1, the method for manufacturing a bent substrate provided with a print layer of the present embodiment includes a preparation step of preparing a bent substrate to be printed (step S1), a masking step of forming a masking material on the bent substrate by appropriate means to form a predetermined pattern (step S2), a printing step of applying a printing material to the bent substrate including the masking material to form a print layer (step S3) and a removal step of removing the masking material from the bent substrate (step S4). By this, the print layer is formed on only a non-masked part, the print layer is not formed on a masked part, and a predetermined pattern appears.

Figure 2:
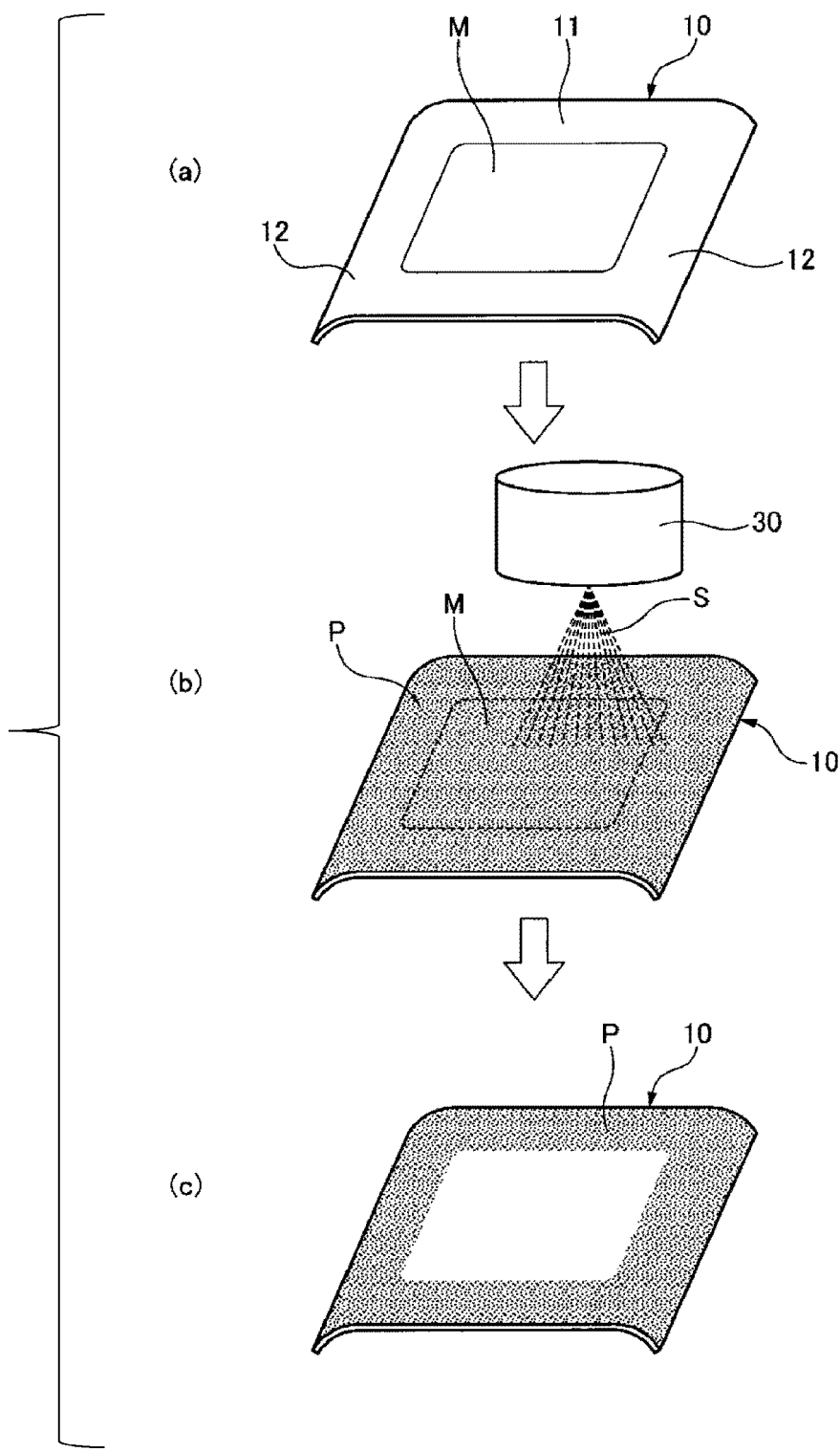

Referring to FIG. 2, as materials for a bent substrate 10 prepared in the preparation step (step S1), woods; glasses such as an inorganic glass and an organic glass such as an acrylic resin and a polycarbonate; general-purpose resins such as polyethylene terephthalate; fluorine resins such as ETFE; and the like can be used. The bent substrate 10 desirably has relatively smooth surface, and has a flat surface part 11 and a curved surface part 12. The inorganic glass is preferred in the method for manufacturing a bent substrate of the present invention from the standpoints of low chemical reactivity to a solvent in removing a masking material or ink, and high weathering resistance and impact resistance. The inorganic glass is preferably subjected to strengthening treatment such as a physical strengthening treatment or a chemical strengthening treatment. When a thickness of the inorganic glass is 2 mm or less, a chemical strengthening treatment is preferred. The upper limit of the thickness of the substrate is preferably 5 mm, more preferably 3 mm and still more preferably 2 mm. When the thickness of the substrate is the upper limit or less, a lightweight bent substrate provided with a print layer is obtained, facilitating handling. The lower limit of the thickness of the substrate is preferably 0.3 mm and more preferably 0.5 mm. When the thickness of the substrate is the lower limit or more, a high strength bent substrate provided with a print layer is obtained.

The thickness may be a thickness in the flat surface part 11 and may be a thickness in the curved surface part 12. The thickness in the curved surface part 12 means a distance of from one main surface to the other main surface when a normal line to a tangent at an optional point on the one main surface has been drawn to the other main surface in a cross-sectional view along the thickness direction.

The curved surface part 12 means a region having a curvature radius R of 1000 mm or less and the flat surface part 11 means a region having a curvature radius R of more than 1000 mm. According to the present invention, printing can be uniformly performed to the curved surface part 12 having small curvature radius such that the curvature radius R is 700 mm or less. The curvature radius R is preferably 500 mm or less and more preferably 200 mm or less.

The curvature radius R of the curved surface part 12 is preferably 1 mm or more, more preferably 5 mm or more and still more preferably 10 mm or more. When the curvature radius of the curved surface part is the lower limit or more, droplets of an ink uniformly reach in a spraying method including electrostatic spraying described later, and more uniform print layer can be formed.

There is an index of "bending depth" showing a depth of bending of the bent substrate 10. The bending depth is defined as a distance between a line segment connecting two edges, and a tangent contacting a curved surface part of a bent substrate of straight lines parallel to the line segment, in a cross-sectional view along the thickness direction of a bent substrate. The bending depth of the bent substrate 10 is preferably 1000 mm or less, more preferably 800 mm or less, still more preferably 500 mm or less and particularly preferably 200 mm or less. When a bent substrate has the bending depth of the lower limit or more, uniform print layer can be formed on the bent substrate 10 having large bending that could not have been printed by a method so far such as conventional methods.

The lower limit of the bending depth of the bent substrate 10 is not particularly limited, but is preferably 3 mm or more, more preferably 5 mm or more and still more preferably 10 mm or more. When the printing method according to the present invention is used to the bent substrate 10 having small bending depth but having a bending depth of the lower limit or more, that could not have been uniformly printed by a conventional screen printing method or the like, a bent substrate provided with a uniform print layer is obtained.

The bending angle centering on the center of curvature of the curved surface part 12 of the bent substrate 10 is not particularly limited so long as it is 360° or less. The bending angle is preferably 270° or less, more preferably 180° or less, still more preferably 135° or less, particularly preferably 120° or less and especially preferably 90° or less. A uniform printing could not have been conventionally carried out on the bent substrate 10 having a curved surface part of such a bending angle. In the present invention, a bent substrate provided with a uniform print layer is obtained while maintaining a part on which a print layer is not formed.

The curved surface part 12 of the bent substrate 10 may have a twist structure. The twist structure is a structure having a twisted surface and means a structure provided with a region having different curvature radii in the same curved surface part such that when a curvature radius at one edge side of the curved surface part 12 is R1, a curvature radius at the other edge side of the curved surface part 12 is R2. A print layer could not have been uniformly formed on the bent substrate 10 having such a twist structure by a conventional printing method. In the present invention, a bent substrate provided with a uniform print layer is obtained while maintaining a part on which a print layer is not formed.

The surface of the bent substrate 10 is preferably smooth as described before. In the case of expecting suppression of peeling of the print layer by an anchor effect, it is considered that the surface is somewhat roughened. For this reason, the surface roughness of the bent substrate 10 in the present embodiment is generally, for example, 1 nm to 1000 nm and preferably 1 nm to 500 nm, in terms of arithmetic average roughness Ra. The surface roughness is not particularly limited to only the arithmetic average roughness Ra so long as it is a parameter showing "surface roughness" such as arithmetic average waviness (Wa) or maximum height Rz.

The masking step (step S2) forms a masking material M on the surface of the bent substrate 10, thereby forming a predetermined pattern by the masking material M. The masking material M used may be any of the inorganic or organic inks which will be explained in the printing step described later, but properties different from an ink (ink material) used in the printing step are required. For example, in the case where the ink is not water-soluble, the masking material M is preferably water-soluble. Alternatively, the masking material M sublimating at a temperature greatly lower than the sublimation temperature of the ink is preferred. Furthermore, when the viscosity of the masking material M is too large, chips are easy to be generated, and on the other hand, when the viscosity is too small, bleeding is easy to be generated. Therefore, it is preferable to use a masking material M with an appropriate viscosity to form further precise pattern by masking.

Technologies such as screen printing, inkjet printing, pad printing, film transfer printing, and spray printing such as electrostatic spraying or twin-fluid spraying are used in the masking formation step.

The screen printing forms a masking layer on the surface of the bent substrate 10 by horizontally positioning a screen plate having a predetermined pattern thereon to the bent substrate 10, arranging the screen plate on the upper surface of the bent substrate 10, and passing the masking material M supplied in an appropriate amount on the upper surface of the screen plate through a screen. The screen plate is formed by fixing an outer periphery of a flexible sheet-like screen with a frame having high rigidity. Therefore, the screen printing is preferred to form a planar pattern on a relatively flat surface of the bent substrate 10.

The inkjet printing is a method of ejecting fine droplets of liquefied masking material M in a pulse state from a nozzle and forming a dotted pattern on the bent substrate 10. The bent substrate 10 is positioned on the basis of the origin of a nozzle transfer mechanism, and the nozzle moves in almost a horizontal direction on the surface of the bent substrate 10 while ejecting fine droplets of the masking material M based on the command from a computer. By laminating one or more layers of this, a dotted masking layer is continuously formed and a masking layer having a predetermined patter is formed. In the case where the surface to be printed of the bent substrate 10 is relatively steep curved surface, it is preferred that a distance between the nozzle ejecting droplets of the masking material M and the bent substrate 10 is nearly constant, considering strain of a pattern and the like. In other words, it is preferred that the distance between the nozzle and the bent substrate 10 is maintained nearly constant and a mechanism of rotating and moving a nozzle is then used according to a pattern.

The pad printing is a method of positioning and fixing a bent substrate on the basis of the origin of a pad transfer mechanism and transferring a predetermined pattern formed on the surface of a printing plate to the bent substrate 10 by using a pad which is an elastic body. The pad comes into contact with the printing plate, and the predetermined pattern previously formed on the printing plate is transferred to the pad surface. The pad comes into contact with the surface to be printed of the bent substrate to transfer the pattern on the surface of the pad to the bent substrate 10, and the masking layer is formed on the bent substrate 10. A material having relatively low elastic modulus, for example, silicone rubber, is used as a pad material. As a result, followability to the shape of the surface during transferring is improved, and it can be used in the bent substrate 10 having relatively steep curved surface.

The film transfer printing is that the masking material M having a predetermined pattern is formed on a film, the film is brought into contact with the surface to be printed of the bent substrate 10, the masking material M formed on the film is transferred to the bent substrate 10, and the film is removed, thereby forming a masking layer on the bent substrate 10. The film material preferably has flexibility capable of following the shape of the surface to be printed of the bent substrate 10. When the film is brought into contact with the surface to be printed of the bent substrate 10, positioning of the film is conducted as necessary. When the masking material M is transferred to the bent substrate 10, means such as pressurization by rubber rolls or heating is supplementally conducted.

As described above, in the bent substrate 10 having the flat surface part 11 and the curved surface part 12 as shown in FIG. 2, the region on which the masking material M is formed may be the flat surface part 11 and may be the curved surface part 12. However, when the masking step is conducted by screen printing, inkjet printing or film transfer printing, the masking material M is preferably formed on the flat surface part 11.

For the bent substrate 10 having a pattern of the masking material M formed by various printing technologies, the whole bent substrate 10 including the masking pattern is sent to a heating furnace and heat-treated therein in order to fix the masking material M. The heat treatment temperature is preferably lower than the sublimation temperature and decomposition temperature of the masking material M. The heat treatment temperature is preferably 250° C. or lower and more preferably 230° C. or lower. The lower limit of the heat treatment temperature is not particularly limited so long as the masking material can be fixed, but is preferably 25° C. or higher and more preferably 40° C. or higher.

This stabilization treatment may be conducted by a method other than heat curing depending on a material of the masking material M. For example, in the case of an ultraviolet-curing resin, the treatment may be conducted by UV exposure. As described above, in the case of carrying out the heat treatment or UV exposure to the masking material M, the masking material M may shrink or expand. For this reason, it is preferred to appropriately adjust a size of the masking material before fixing beforehand in order to form the masking material M having a desired size.

The shape of the masking pattern is not particularly limited, and the masking pattern is formed so as to be the desired shape of the print layer finally obtained. The shape of the masking pattern can be a rectangle, a circle, a polygon or the like in a planar view. According to the present invention, the print layer having a complicated shape can be efficiently formed in high accuracy.

The printing step (step S3) forms a print layer P on the surface to be printed of the bent substrate 10 including the masking material, and technologies such as spray printing, inkjet printing, pad printing and dip printing that can print on the curved surface part 12 of the bent substrate 10 can be applied. Particularly, in those printing technologies, the print layer can be evenly formed on the surface to be printed, and it is not necessary to conduct printing by dividing the printing according to the printing regions.

The spray printing is a method of forming a print layer by jetting a mixture of an ink (printing material) and a gas from a spray nozzle and spraying the mixture to the surface to be printed. For example, the spray nozzle is attached to a robot arm and applies an ink to the entire surface of a substrate while moving according to the course programmed beforehand. The spray printing can efficiently print over a wide area, and a uniform print layer can be formed on the curved surface part 12 by optionally changing the relative position of the spray nozzle and the surface to be printed. Furthermore, the color tone of the printed surface and the thickness of the print layer are easily adjusted by adjusting a mixing proportion of an ink and a gas. A plurality of inks may be used, but the same ink is preferably used from the standpoints of adhesiveness of the print layer and uniformity of the color tone.

An electrostatic spray method using an electrostatic coating gun may be used as the spray printing and a print layer may be formed. The electrostatic spray method is a method of applying a coating liquid obtained by mixing a printing material, a solvent and the like to a substrate by utilizing electrostatic force. Because the printing is carried out by utilizing electrostatic force, the electrostatic spray method is excellent in that uniform printing can be performed and particularly, uniform printing can be performed on the bent substrate 10 having a curved surface part. When a glass is used as the bent substrate 10, it is preferred to impart conductivity to a jig fixing the bent substrate 10. Material of the jig having conductivity is not particularly limited, and a metal, carbon and a conductive resin can be used. By this, charges can be promptly removed from an electrostatically charged printing material which reached on the substrate, and the print layer can be efficiently and uniformly formed.

The pad printing is a method of forming a print layer by transferring a predetermined pattern formed on the surface of a printing plate to the bent substrate 10 by using a pad which is an elastic body, similar to the masking step, and the printing can be performed on a relatively steep curved surface part 12 of the bent substrate 10. By using a material having relatively low elastic modulus, for example, silicone rubber as a pad material, similar to the above, followability to the shape of the surface during transferring is enhanced.

The dip printing is a method of forming a print layer by dipping the bent substrate 10 in an ink (printing material), and can effectively print on a wide area. Furthermore, a uniform print layer can be formed on both surfaces of the bent substrate 10 including ends. Other than the masking material M, surfaces and end faces not requiring printing must be previously covered with a film or the like. Furthermore, the color tone of the printed surface and the thickness of the print layer can be easily adjusted by adjusting the component(s) and/or the solvent(s) of the ink. A plurality of inks may be used, but the same ink is preferably used from the standpoints of adhesiveness of the print layer and uniformity of the color tone.

Other than the printing method described above, spin coat printing or roll printing can be applied depending on the shape of the bent substrate 10, for example, in the case where a curvature radius of a curved surface part is large or the case where a bending depth of a curved surface part is small.

The spin coat printing is that the bent substrate 10 is positioned on the basis of the center of rotation of a spin coater, an ink is dropped on the surface, the bent substrate 10 is rotated, and a uniform print layer is formed by utilizing a centrifugal force. Because excessive ink scatters to the outside from end faces of the bent substrate 10, a uniform print layer is easily formed without unevenness. Furthermore, the color tone of the printed surface and the thickness of the print layer can be easily adjusted by adjusting the component(s) and/or the solvent(s) of the ink and a rotation speed. A plurality of inks may be used, but the same ink is preferably used from the standpoints of adhesiveness of the print layer and uniformity of the color tone.

The roll printing is a printing method of forming a print layer by rotating a cylindrical roll along the bent substrate 10, thereby transferring an ink on the roll surface to the bent substrate 10, and the printing can be efficiently performed on a wide area. Furthermore, a region on which a print layer is formed can be restricted by optionally changing a size of the roll. The color tone of the printed surface and the thickness of the print layer can be easily adjusted by adjusting the component(s) and/or the solvent(s) of the ink. A plurality of inks may be used, but the same ink is preferably used from the standpoints of adhesiveness of the print layer and uniformity of the color tone.

The ink (printing material) used in the above-described printing step may be an inorganic ink or an organic ink.

For example, a composition containing at least one member selected from $SiO_2$, ZnO, $B_2O_3$, $Bi_2O_3$, $Li_2O$, $Na_2O$ and $K_2O$; at least one member selected from CuO, $Al_2O_3$, $ZrO_2$, $SnO_2$ and $CeO_2$; $Fe_2O_3$ and $TiO_2$ can be used as the inorganic ink.

Various printing materials prepared by dissolving a resin in a solvent can be used as the organic ink. For example, at least one member selected from the group consisting of resins such as acryl resins, urethane resins, epoxy resins, polyester resins, polyamide resins, vinyl acetate resins, phenol resins, olefins, ethylene-vinyl acetate copolymer resins, polyvinyl acetal resins, natural rubbers, styrene-butadiene copolymers, acrylonitrile-butadiene copolymers, polyester polyols and polyether polyurethane polyols can be selected and used as the resin.

Water, alcohols, esters, ketones, an aromatic hydrocarbon solvent and an aliphatic hydrocarbon solvent are used as the solvent. For example, isopropyl alcohol, methanol, ethanol and the like can be used as alcohols, ethylene acetate can be used as esters and methyl ethyl ketone can be used as ketones. Toluene, xylene, SOLVESSO 100 and SOLVESSO 150 manufactured by Exxon Mobil Corporation, and the like can be used as the aromatic hydrocarbon solvent and hexane and the like can be used as the aliphatic hydrocarbon solvent.

The organic ink becomes a print layer by applying it to the transparent bent substrate 10 and vaporizing a solvent, to form a layer of a resin. The above-described inks are merely examples, and other than those, various printing materials can be used.

The ink used in the print layer may contain a colorant. For example, in the case where the print layer is black, a black colorant such as carbon black can be used. Other than this, a colorant having an appropriate color depending on a desired color can be used.

For the substrate having the print layer formed thereon, as a step for drying and sintering the ink, the whole printed bent substrate 10 having a masking pattern remaining thereon is transferred to a heating furnace, then is heat-treated. The heat treatment method is preferably a convection heating system circulating heated gas in the heating furnace.

The heat treatment temperature is preferably lower than the sublimation temperature and decomposition temperature of the masking material M, and more preferably lower than the sublimation temperature and decomposition temperature of the masking material M and print layer. The heat treatment temperature is preferably 250° C. or lower and more preferably 230° C. or lower. The lower limit of the heat treatment temperature is not particularly limited so long as the print layer can be dried and sintered, but is preferably 25° C. or higher and more preferably 40° C. or higher.

In the case where the printing is repeatedly conducted to form a laminate or the case where the color is changed, a series of the printing operation is repeatedly conducted. The printing material is not limited to a material to be dried and sintered, but UV curable material may be used.

In the case where UV curable material is used for the printing material, it is preferred that the masking material M is a non-photosensitive material to UV and the like. In the case of using the UV curable printing material, it has been conventionally required to form a desired print layer by using an exposure mask. In the present invention, a desired print layer is obtained by previously forming a pattern by the masking material M and applying a printing material to the pattern. For this reason, it is not necessary to prepare an expensive exposure mask and a print layer can be inexpensively formed. Conventionally the positioning between an exposure mask and a substrate is difficult, and particularly in the case of a bent substrate, the positioning is further difficult and a print layer could not have been formed in high accuracy. High accuracy print layer can be formed in good productivity by the present invention.

On the removal step (step S4) of the masking material M, means such as elution in a solvent, sublimation by heating, melting by heating, mechanical stripping and the like can be used, and is appropriately selected depending on the combination of the masking material M and properties of an ink.

In the method of eluting the masking material M in a solvent, the bent substrate 10 is dipped in a solvent in a container, and after allowing to stand for a certain period of time, the bent substrate 10 is cleaned with water to conduct a rinsing treatment. As necessary, the solvent may be stirred in the processes of dipping and cleaning. The solvent used is water, an organic solvent or the like and is selected depending on the kind of a masking material, but it is required that the solvent does not have reactivity to the ink of the print layer and the ink does not elute.

Specifically, in the case where the masking material M is water-soluble, the masking material M may be removed by cleaning with water.

In the method of sublimating by heating, the bent substrates 10 are placed in a heating furnace such as an electric furnace with a space to the adjacent bent substrate 10 (for example, adjacent bent substrates 10 in upper and lower directions), temperature rising and cooling are conducted in a predetermined inclination, the substrate is taken out of the heating furnace and sufficiently cooled, and then, the bent substrate 10 is cleaned with water to conduct a rinsing treatment. The temperature of the heating furnace is preferably set to a temperature at which the masking material M can sublimate and the ink does not change in quality. The heating furnace is preferably a system that can ventilate a gas in the furnace, not a closed system.

Therefore, the masking material M is sublimated by the heat in the drying and sintering process of the ink in the printing step S3, and more specifically, the drying and sintering process of the ink and the removal step of the masking material M can be simultaneously carried out by heating the bent substrate 10.

The mechanical stripping is that a rotating brush is brought into contact with the bent substrate 10 while supplying cleaning water and the masking material M is mechanically removed and washed out. It is preferred to set hardness, pressing force, the number of rotation, and the like of the brush such that the ink layer is not damaged. The mechanical stripping is not limited to this, and when the masking material M is a film shape, the masking material M may be peeled manually or by using a machine.

Considering the quality of the surface after removing the masking material M, the removal of the masking material M is preferably a method of eluting the masking material M in the solvent. Furthermore, after removing the masking material M, cleaning may be conducted by water cleaning, solvent cleaning, plasma cleaning, corona cleaning, ultrasonic cleaning or the like. By this, residual components derived from the masking material M can be decomposed, and substrate surface can be made to be clean.

EXAMPLES

Example of forming a pattern by the masking material M on a bent glass as a bent substrate utilizing screen printing technology, forming a print layer by spray printing technology and then eluting the masking material M in a solvent to remove the masking material is specifically described below.

Figure 3:
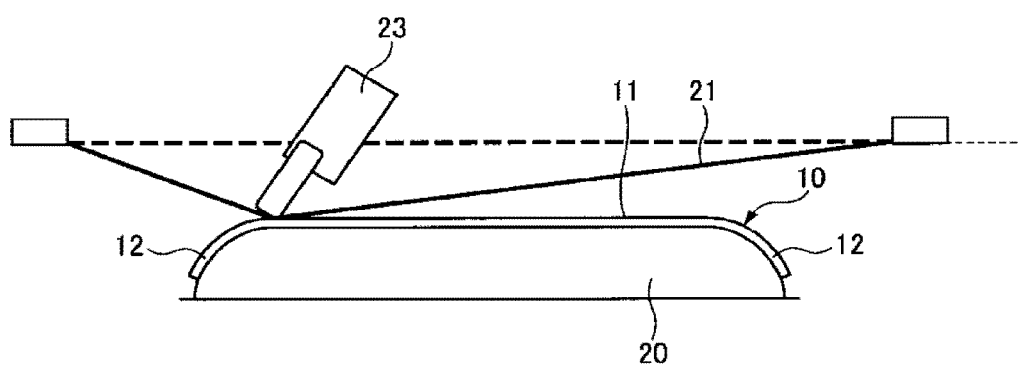
FIG. 3 is a schematic view illustrating the state that a masking material is formed on a flat surface part of a bent substrate by screen printing.
(a) to (d) of FIG. 4 are cross-sectional views along the thickness direction of a bent glass, illustrating a vicinity of the boundary between the print layer on the bent glass and the non-print surface in the order of steps.
(a) of FIG. 5 is a schematic view illustrating the state of processing an upper part of an end face of a print layer by grinding, (b) of FIG. 5 is a cross-sectional view along the thickness direction of a bent substrate provided with a print layer having a processed end face formed by processing an upper part of an end face of a print layer by grinding and (c) of FIG. 5 is a cross-sectional view illustrating an assembly of a bent substrate and a display panel laminated thereon together with a visual direction.

The masking treatment work is that as shown in FIG. 3, a bent glass 10 having clean surface is positioned at a predetermined position on a jig 20 of a masking apparatus not shown and is fixed to the jig 20 by using a means such as vacuum adsorption not shown. The shape of the jig 20 for fixing the bent glass 10 is a shape corresponding to a main surface of the bent glass 10 contacting the jig 20. Therefore, the bent glass 10 is firmly fixed to the jig 20 coupled with the fixation by vacuum adsorption.

As a modification example, a concave part (not shown) with a bottom having the same shape as the main surface of the bent glass 10 is provided in the jig 20, and as a result, the bent glass 10 can be further surely fixed.

A screen plate 21 having a rectangular pattern, prepared in conformity with a region to be printed on a flat surface part 11 of the bent glass 10, that is a forming surface of the masking material M, is arranged on the upper side of the bent glass 10. An appropriate amount of the masking material M is supplied to the upper surface of the screen plate 21, and a squeegee 23 is moved while pushing to the upper surface of the screen plate 21. As a result, a masking layer having a rectangular shape pattern is formed on the flat surface part 11 of the bent glass 10 (see (a) of FIG. 2).

The whole bent glass 10 including the masking layer is sent to a heating furnace, and the masking material M is stabilized by heat curing.

The bent glass 10 having the masking material M formed thereon is positioned at a predetermined position on a printing apparatus not shown, and then fixed by utilizing a means such as vacuum adsorption. The bent glass 10 may be positioned on the printing apparatus together with the jig 20 used in the masking apparatus. As shown in (b) of FIG. 2, a mixture of an ink S and a gas is ejected from a spray nozzle 30 and sprayed to the entire surface of the bent glass 10 including the masking layer, thereby forming a print layer P. In other words, the ink S in spray printing is applied to the upper surface of the masking layer. Positioning accuracy of the bent glass 10 when conducting spray printing may be accuracy lower than the positioning in the case of conducting a masking treatment. By applying the ink S by the spray nozzle 30, for example, a curved surface part 12 largely curved that is difficult to be treated by screen printing can be easily printed.

The bent glass 10 having the ink S applied to the entire surface thereof is conveyed into a heating furnace and is heat-treated, thereby drying and sintering the ink S.

The bent glass 10 having the dried ink S is dipped in a solvent in a container and is allowed to stand for a certain period of time, and only the masking material M is selectively eluted and removed. Thereafter, the bent glass 10 is cleaned with water to perform a rinsing treatment.

By the above, the masked part of the bent glass 10 is exposed as shown in (c) of FIG. 2, and the pattern of the print layer P appears on the part other than the masked part. When conveying the bent glass 10 into a next step as a product, a cleaning treatment is conducted to remove a solvent attached to the surface of the glass.

The masking material M is formed by screen printing. Therefore, the edge part of the rectangular pattern is printed with good accuracy. For this reason, the boundary between the glass surface from which masking has been removed and the print layer P by spray printing is smooth, and good appearance is achieved.

Figure 4:
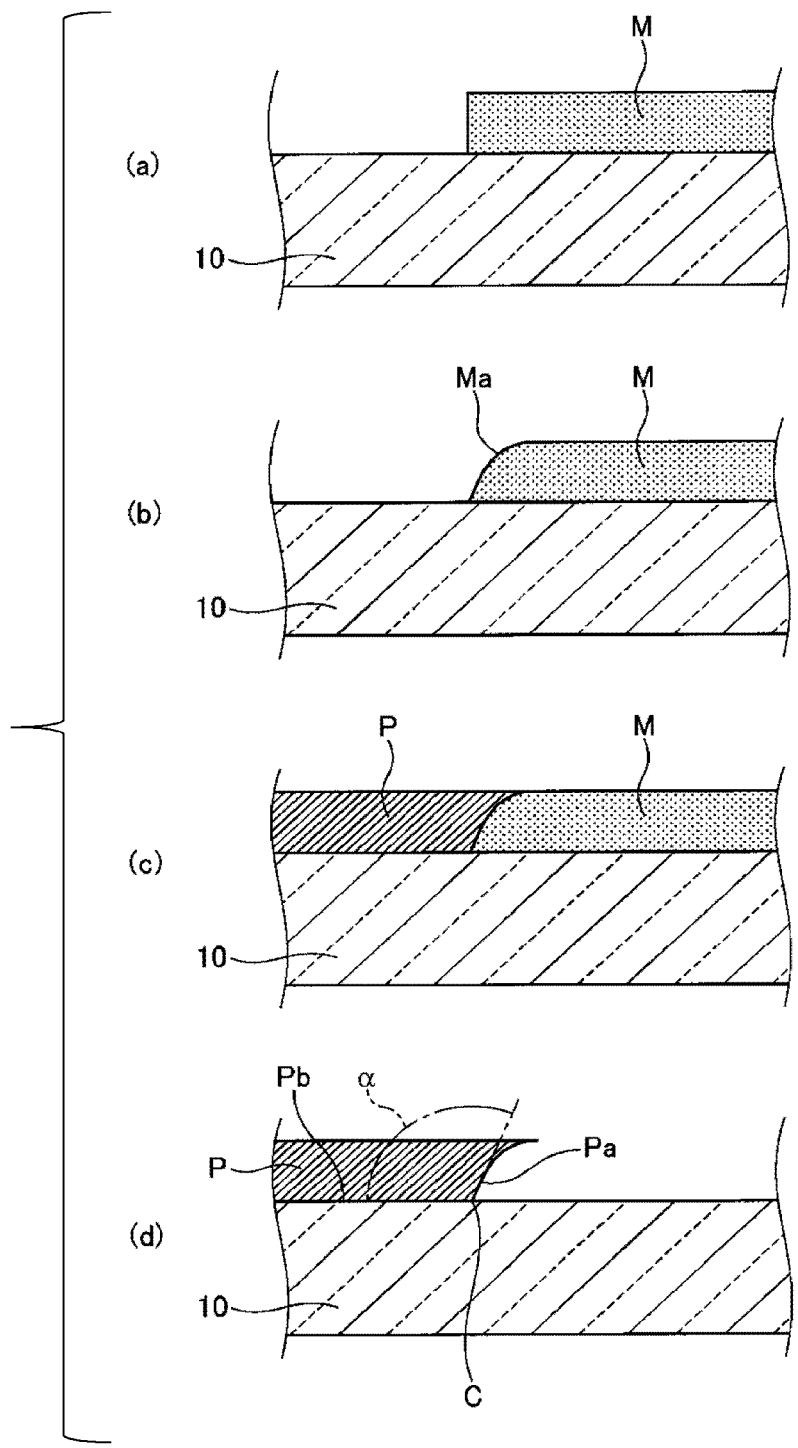

(a) to (d) of FIG. 4 are cross-sectional views in the thickness direction of the bent glass 10, showing the vicinity of the boundary (that is, the edge of the pattern) between the print layer P and the non-printed surface on the bent glass 10 in the order of the above steps. As shown in (a) of FIG. 4, the bent glass 10 having the masking material M formed thereon is thermally cured to shrink a free edge part Ma of the masking material M (see (b) of FIG. 4). The print layer P is formed on the bent glass 10 in this state as shown in (c) of FIG. 4. Therefore, the print layer P having an end face Pa shown in (d) of FIG. 4 is formed on the bent glass 10 from which the masking material M has been removed.

In other words, when the print layer P is formed by using the masking material M having good accuracy as described above, the angle α formed by the end face Pa (hereinafter referred to as a lower end face) of the print layer P and a surface Pb of the print layer P contacting the surface of the bent glass 10 is an obtuse angle, centering on the boundary C between the print layer P and the non-printed surface on the bent glass 10 in a cross-sectional view along the thickness direction of the bent glass 10 shown in (d) of FIG. 4. Specifically, the angle α is preferably more than 90° and 120° or less. By this, the accuracy of the end face Pa of the print layer P is improved, and the print layer P can have a uniform thickness up to the vicinity of the end face thereof. Therefore, when a display panel is adhered to the non-printed surface, good appearance is obtained. In this case, the angle formed by the non-printed surface and the end face of the print layer P, adjacent to the angle α is an acute angle, and is 60° or more and less than 90°. When the angle is within this range, air is difficult to remain in spaces when an adhesive used in adhering a display panel has been attached, and defects are difficult to be generated when adhering. Furthermore, the angle α formed by the end face of the print layer P and the surface Pb of the print layer P contacting the surface of the bent glass 10 is an obtuse angle. Therefore, when a display panel is adhered to the non-printed surface, the display panel is fitted to a used adhesive layer, and the bent glass 10 provided with the print layer P and the display panel are strongly fixed to each other, making it difficult to peel. By this, the assembly can be used over a long period of time.

The angle α of the print layer P is formed depending on shrinkage of the free edge part Ma of the masking material M, but the angle α may be formed by cleaning the end face of the masking material M.

Figure 5:
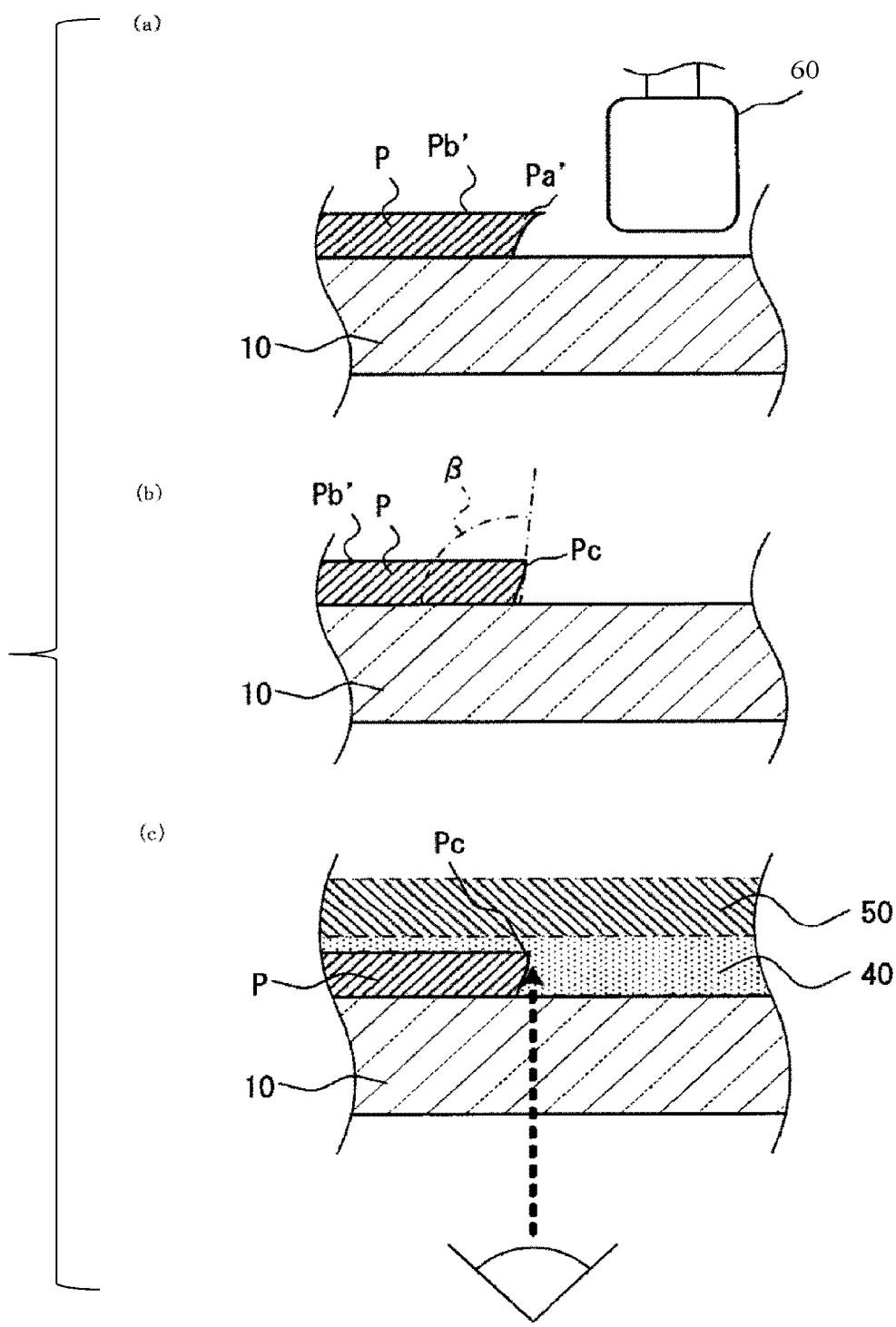

The end face Pa of the print layer P may be cleaned or processed in the bent glass 10 provided with the print layer P shown in (d) of FIG. 4. In particular, regarding the end face Pa of the print layer P, it is preferred that as shown in (a) of FIG. 5, an upper end face Pa' in the end face at a surface Pb' side of the print layer P not contacting the surface of the bent glass 10 is processed by grinding or the like using a grinding tool 60 to form a processed end face Pc. By this, the bent glass 10 provided with the print layer P having the processed end face Pc on the upper part of the print layer P as shown in (b) of FIG. 5 is obtained. The upper end face Pa' that is most difficult to obtain end face accuracy in the print layer P can be formed into the processed end face Pc having good linearity and high accuracy. In the case where a display panel 50 is adhered to the bent glass 10 through an adhesive layer 40 as shown in (c) of FIG. 5, when viewing the display panel 50 through the bent glass 10, the end face Pc having high accuracy of the end face Pc of the print layer P can be visually recognized and the appearance can be improved. The upper end face Pa' has small thickness and is brittle. Therefore, when adhering to the display panel, the upper end face Pa' breaks, and this tends to be a disadvantage. When the upper end face Pa' is processed to form the processed end face Pc, the above problem can be solved and the bent glass 10 having excellent appearance provided with the print layer P that can be strongly fixed to the display panel 50 through the adhesive layer 40 is obtained.

In the cross-sectional view along the thickness direction of the bent glass 10 provided with the print layer P, an angle β formed by a tangent of the processed end face Pc and a surface Pb on the bent glass 10 satisfies α≥β. The angle β is preferably 45° or more and 120° or less, more preferably 45° or more and 115° or less and still more preferably 60° or more and 90° or less.

Particularly, in the present example, a bent glass provided with a print layer having good accuracy and good productivity is given by using a water-soluble masking liquid as an ink for the masking material M and a urethane ink as an ink for forming a print layer.

As described above, the method for manufacturing a bent substrate according to the present example has a masking step of forming the masking material M on the bent substrate 10 to form a predetermined pattern and a printing step of forming the print layer P on the surface to be printed of the bent substrate 10 including the masking material M.

Therefore, printing can be performed in good productivity with high printing accuracy to the surface to be printed of the bent substrate 10.

Furthermore, since the method is further provided with a mask-cleaning step of cleaning the end face of the masking material M after the masking step, the end face having a desired angle α of the print layer P can be given.

Since the method is further provided with a heating step of heating a printing material printed on the bent substrate 10, the printing material can be efficiently dried.

Since the method is further provided with a step of irradiating the printing material printed on the bent substrate 10 with UV, the print layer having high accuracy can be formed in good productivity.

Since the masking step prints a printing material as a masking material, different from a printing material used in the printing step, the masking step can be carried out in good productivity.

Since the printing step is conducted by a spray method of ejecting a printing material from a nozzle and applying it to the bent substrate 10, printing can be efficiently performed on the surface to be printed having wide area.

Since the masking material M is formed on the flat surface part 11 of the bent substrate 10 having the flat surface part 11 and the curved surface part 12, masking with high accuracy becomes possible by technologies such as screen printing, inkjet printing, pad printing and transfer printing.

Since the method is further provided with the removal step of removing the masking material M formed on the bent substrate 10 after the printing step, the part that is not printed by masking is exposed by removing the masking material M, and a print pattern appears.

Since the removal step of the masking material M is a step of eluting the masking material M in a solvent, the masking material M can be efficiently removed.

Since the method is further provided with the step of removing an end face Pa of the print layer P after the removal step of the masking material M, the appearance when adhered with a display panel can be improved.

In the masking step and the printing step, a jig 20 for fixing the bent substrate 10 is used and the jig 20 has a shape corresponding to the main surface of the bent substrate 10 contacting the jig 20. Therefore, the bent substrate 10 can be held with good position accuracy and stably, facilitating masking work and printing work.

The present invention is not construed as being limited to the above-described embodiments and examples, and modifications, improvements and the like can be appropriately made.

For example, in the above-described examples, the predetermined pattern by masking has a rectangular shape, but the predetermined pattern is not limited to this. For example, a plurality of rectangular patterns may be arranged at intervals, and patterns, logo and the like given by a print layer may be provided inside the rectangular shape of the masking material M.

The masking formation step of the present invention may form the masking material M by other methods, other than masking a predetermined pattern by various printing technologies of the present embodiment. In such cases, unnecessary part of the masking material M may be removed by laser processing to form a predetermined pattern shape.

This application is based on Japanese Patent Application No. 2016-78186 filed Apr. 8, 2016, the disclosure of which is incorporated herein by reference.

DESCRIPTION OF REFERENCE NUMERALS AND SIGNS

10 Bent substrate (bent glass)
11 Flat surface part
12 Curved surface part
20 Jig
21 Screen plate
23 Squeegee
30 Spray nozzle
M Masking material
P Print layer
S Ink (printing material)

The invention claimed is:

1. A method for manufacturing a bent substrate provided with a prim layer, comprising:
    a masking step of forming a masking material on a bent substrate to form a predetermined pattern; and
    a printing step of forming a print layer on a surface to be printed of the bent substrate provided with the masking material, and
    a mask-cleaning step of cleaning an end face of the masking material after the masking step.

2. The method for manufacturing a bent substrate provided with a print layer according to claim 1, further comprising a heating step of heating a printing material printed on the bent substrate.

3. The method for manufacturing a bent substrate provided with a print layer according to claim 1, further comprising a step of irradiating a printing material printed on the bent substrate with UV.

4. The method for manufacturing a bent substrate provided with print layer according to claim 1, wherein in the masking step, a printing material different from a printing material used in the printing step is printed as the masking material.

5. The method for manufacturing a bent substrate provided with a print layer according to claim 1, wherein in the printing step, a printing material is ejected from a nozzle to be applied to the bent substrate.

6. The method for manufacturing a bent substrate provided with a print layer according to claim 1, wherein the printing step is carried by a spraying method comprising ejecting a printing material from a nozzle to be applied to the bent substrate.

7. The method for manufacturing a bent substrate provided with a print layer according to claim 1,
wherein the bent substrate comprises a flat surface part and a curved surface part, and
the masking material is formed on the flat surface part.

8. The method for manufacturing a bent substrate provided with a print layer according to claim 1, further comprising a removal step of removing the masking material formed on the bent substrate after the printing step.

9. The method for manufacturing a bent substrate provided with a print layer according to claim 8, wherein the removal step is a step of eluting the masking material in a solvent.

10. The method for manufacturing a bent substrate provided with a print layer according to claim 8, further comprising a step of removing an end face of the print layer after the removal step.

11. The method for manufacturing a bent substrate provided with a print layer according to claim 1, wherein the bent substrate is fixed with a jig in at least one step of the masking step and the priming step, and the jig has a shape corresponding to the main surface of the bent substrate that contacts the jig.

12. The method for manufacturing a bent substrate provided with a print layer according to claim 1, wherein the bent substrate is a glass.

13. A bent substrate provided with a print layer, having an angle $\alpha$ being an obtuse angle, wherein the angle $\alpha$ centers on the boundary between the print layer and a non-print surface on the bent substrate, and is formed by an end face of the print layer and a surface of the print layer that contacts a surface of the bent substrate, in a cross-sectional view along the thickness direction,
wherein the prim layer is formed on a curved surface part of the bent substrate.

14. The bent substrate provided with a grit t layer according to claim 13, wherein the angle $\alpha$ is larger than 90° and 120° or smaller.

15. The bent substrate provided with a print layer according to claim 13, wherein the following relation is satisfied, $$\alpha \geq \beta,$$

wherein $\beta$ is an angle formed by a tangent of an upper part of an end face of the print layer on the bent substrate and a tangent of the surface of the print layer that contacts the surface of the bent substrate, in a cross-sectional view along the thickness direction.

16. The bent substrate provided with a print layer according to claim 15, wherein the angle $\beta$ is 45° or larger and 120° or smaller.

17. The bent substrate provided with a print layer according to claim 13, wherein the curved surface part has a radius of curvature in a range of 1 mm to 500 mm.

18. The bent substrate provided with a print layer according to claim 13, wherein a thickness of the bent substrate is in a range 0.3 mm to 2 mm.

19. The bent substrate provided with a print layer according to claim 13, wherein the bent substrate is an inorganic glass.

* * * * *